(12) United States Patent
Kim et al.

(10) Patent No.: US 10,336,441 B2
(45) Date of Patent: Jul. 2, 2019

(54) DRONE

(71) Applicant: LG ELECTRONICS INC., Seoul (KR)

(72) Inventors: Jungsik Kim, Seoul (KR);
Hyoungrock Kim, Seoul (KR);
Joongtae Park, Seoul (KR); Sunho Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 15/616,617

(22) Filed: Jun. 7, 2017

(65) Prior Publication Data

US 2017/0355453 A1 Dec. 14, 2017

(30) Foreign Application Priority Data

Jun. 8, 2016 (KR) .................. 10-2016-0071081

(51) Int. Cl.
*B64C 25/00* (2006.01)
*B64C 25/24* (2006.01)
*B64C 25/32* (2006.01)
*B64C 25/52* (2006.01)
*B64C 39/02* (2006.01)
(Continued)

(52) U.S. Cl.
CPC .............. *B64C 25/24* (2013.01); *B64C 25/52* (2013.01); *B64C 39/024* (2013.01); *B64D 31/06* (2013.01); *B64D 45/06* (2013.01); *B64D 47/08* (2013.01); *B64C 2025/008* (2013.01); *B64C 2025/325* (2013.01); *B64C 2201/024* (2013.01); *B64C 2201/027* (2013.01); *B64C 2201/042* (2013.01);
(Continued)

(58) Field of Classification Search
CPC ....... B64C 25/24; B64C 39/024; B64C 25/52; B64C 2201/18; B64C 2201/024; B64D 45/06
See application file for complete search history.

(56) References Cited

U.S. PATENT DOCUMENTS

2011/0264314 A1* 10/2011 Parras .................. G05D 1/0676
701/16
2014/0249702 A1* 9/2014 Pflug ..................... B64C 25/001
701/16
2016/0196755 A1* 7/2016 Navot .................. G05D 1/0676
701/4

FOREIGN PATENT DOCUMENTS

KR          10-1204720 B1      11/2012
KR       10-2015-0000053 A      1/2015
KR       10-2015-0113586 A     10/2015

OTHER PUBLICATIONS

Machine translation of KR 10-2015-0113586 retrieved from KIPRIS on Dec. 25, 2018 (Year: 2018).*

(Continued)

*Primary Examiner* — Thomas Ingram
(74) *Attorney, Agent, or Firm* — Birch, Stewart, Kolasch & Birch, LLP

(57) ABSTRACT

Disclosed is a drone. The present invention includes a plurality of propellers creating a lift to prevent inclination and overturn of the drone due to a lift difference generated from uneven ground, a power driving unit providing a rotation power to each of a plurality of the propellers, a ground sensing unit measuring a distance to a first region of the ground and a shape of the first region, and a controller controlling the power driving unit to differentiate rotation ratios of a plurality of the propellers based on the measured distance and shape if receiving an input signal for landing at the first region.

8 Claims, 15 Drawing Sheets

(51) Int. Cl.
*B64D 31/06* (2006.01)
*B64D 45/06* (2006.01)
*B64D 47/08* (2006.01)

(52) U.S. Cl.
CPC .. *B64C 2201/108* (2013.01); *B64C 2201/127* (2013.01); *B64C 2201/18* (2013.01)

(56) References Cited

OTHER PUBLICATIONS

Machine translation of KR 10-1204720 retrieved from KIPRIS on Dec. 25, 2018 (Year: 2018).*

* cited by examiner

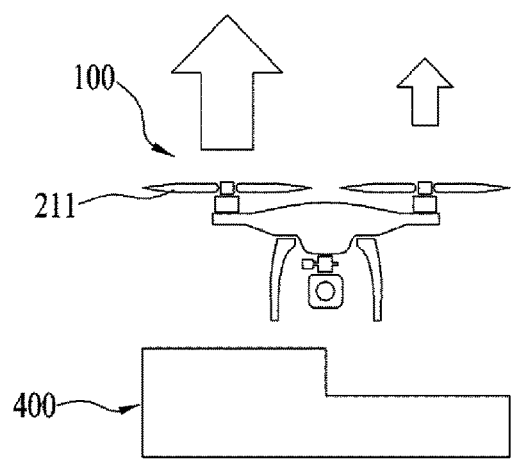 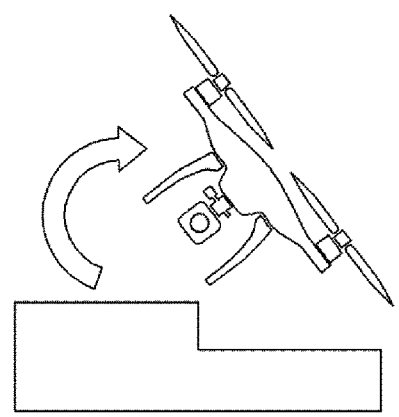
FIG. 5 (a)    FIG. 5 (b)

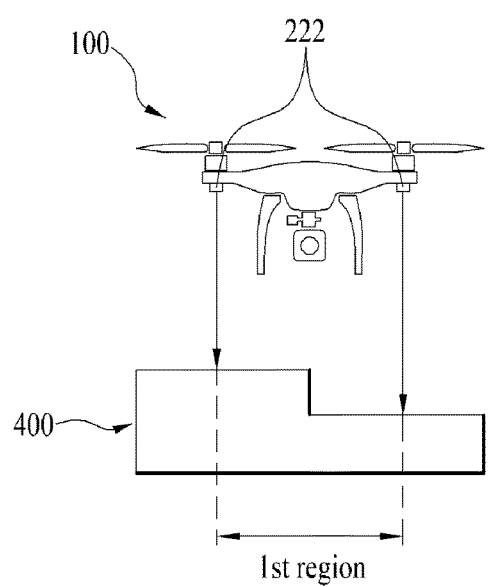 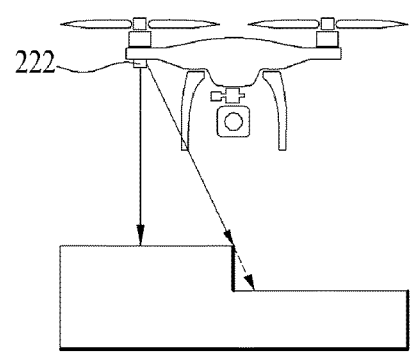
FIG. 7 (a)    FIG. 7 (b)

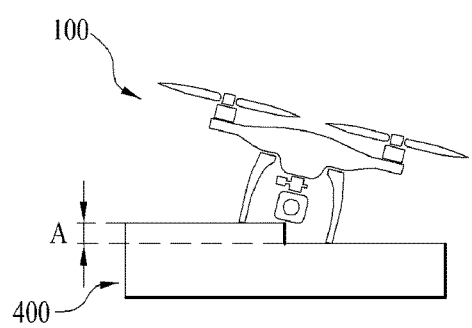
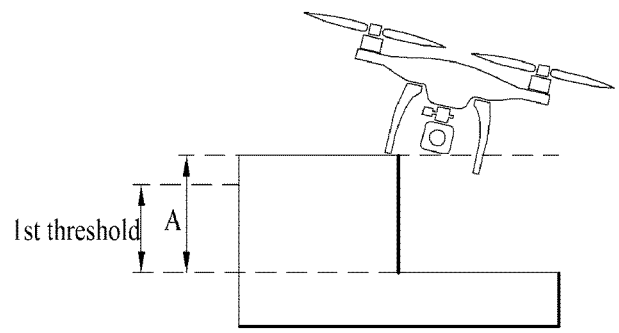
FIG. 9 (a)     FIG. 9 (b)

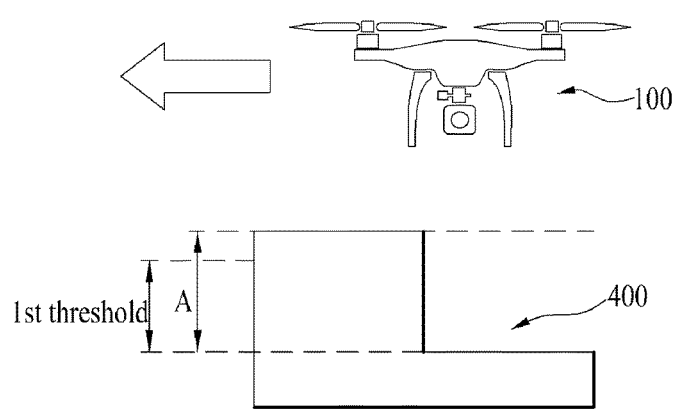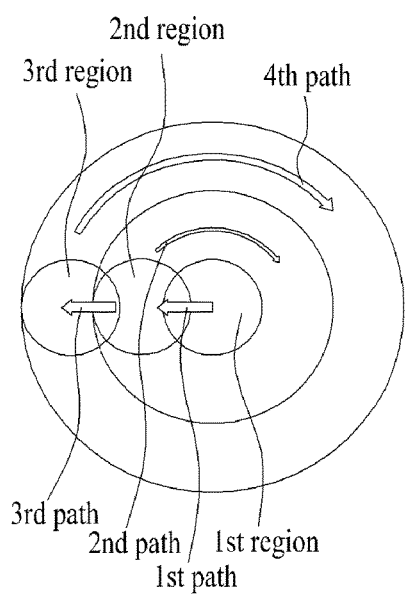
FIG. 10 (a)   FIG. 10 (b)

DRONE

This application claims priority to Korean Patent Application No. 10-2016-0071081 filed on Jun. 8, 2016, in Korea, the entire contents of which is hereby incorporated by reference in its entirety.

BACKGROUND OF THE INVENTION

Field of the Invention

The present invention relates to a drone having a multitude of propellers.

Discussion of the Related Art

Generally, an antenna plays a role in transmitting or receiving wireless signals. The antenna fails to receive incoming signals in all directions with the same performance. Instead, reception performance of the antenna varies depending on a direction and angle of an incoming signal.

An aircraft capable of making a flight with a lift force generated from turning a rotor by an engine is called a helicopter. Such helicopters are classified into a general helicopter big enough to carry persons and a drone corresponding to a relatively small helicopter capable of making an unmanned flight. Recently, owing to the developments of radio communications and mobile terminals, various technologies using functions of drones and mobile terminals are being developed.

Generally, there are two kinds of methods for landing a drone. First of all, there is a method of landing a drone in manual landing mode for landing the drone on a ground through user's manual manipulation of lowering an altitude. Secondly, there is a method of landing a drone on a ground in automatic landing mode in a manner that the drone considers other factors by receiving a separate input for a landing.

According to the former method, since this method can consecutively respond to user's altitude and bearing inputs, a time taken for a landing can be reduced. And, other inputs are not additionally required. Hence, this method is advantageous in enabling an intuitive manipulation.

Yet, when an altitude is lowered, since it is not clear whether a user intends to make a landing, a dangerous situation may occur. Since a landing speed should be consciously controlled, this method may require a more delicate speed control.

In case of using the landing control of the latter, by basically preventing altitude from being lowered unless receiving a landing control input, it may be able to put limitation on lowering the altitude so as not to be lower than a predetermined altitude.

The altitude descent or landing behavior of the drone is conducted by controlling the number of revolutions of a propeller that generates a lift force. A rotated propeller generates a lift force against a ground or a material (e.g., air, etc.) located under the propeller, thereby maintaining or changing an altitude. The altitude change is enabled by controlling the rotation of the propeller to vary a size of a lift force.

Having received a landing input, a drone can be landed on a ground by gradually reducing a size of a lift force in a manner of lowering the number of revolutions of a propeller.

Regarding a plurality of propellers of a drone, it is able to move a bearing of the drone by differently controlling the number of revolutions of each of a plurality of the propellers. Hence, when a drone is landed, in order for the drone to descend vertically at a location while maintaining level, a plurality of propellers should have the same number of revolutions in principle.

Yet, when a ground surface is uneven, if the number of revolutions of each of a plurality of propellers is controlled equally, a lift force difference is generated from the uneven ground surface. Namely, a lift force generated by a propeller corresponding to a convex ground surface is greater than a lift force generated by a propeller corresponding to a concave ground surface.

Eventually, a drone may incline due to a lift difference of each region. If the lift force difference exceeds a predetermined value, the drone may overturn possibly.

Although a balance is maintained by balancing a lift force, since a ground surface is irregular, a landing of a drone is not stable. Hence, the drone may possibly overturn.

Thus, the present invention intends to solve the overturn problem caused by an imbalance of a ground or a lift difference when a drone is landed.

SUMMARY OF THE INVENTION

Accordingly, embodiments of the present invention are directed to a drone that substantially obviates one or more problems due to limitations and disadvantages of the related art.

One object of the present invention is to provide a drone, by which the aforementioned problem of imbalance in lift generated in the course of a drone's access to an uneven ground surface can be solved.

Another object of the present invention is to provide a drone, by which an overturn problem of a drone in the course of landing at an irregular ground surface can be solved.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a drone according to one embodiment of the present invention may include a plurality of propellers creating lift, a power driving unit providing a rotation power to each of a plurality of the propellers, a ground sensing unit measuring a distance to a first region of the ground and a shape of the first region, and a controller controlling the power driving unit to differentiate rotation ratios of the plurality of the propellers based on the measured distance and shape if receiving an input of a user signal for landing at the first region.

Preferably, a plurality of the propellers may include a first propeller and a second propeller. If a height of a first point of the ground corresponding to the first propeller is higher than that of a second point of the ground corresponding to the second propeller, the controller may control the power driving unit to provide a rotation power of the first propeller smaller than that of the second propeller.

Preferably, the controller may control the power driving unit to differentiate the rotation ratios of a plurality of the propellers only if an altitude of the drone is equal to or smaller than a first threshold altitude.

Preferably, the ground sensing unit may include a plurality of sensors configured to measure distances to a vertically downward ground by being provided to locations corresponding to a plurality of the propellers, respectively.

More preferably, if the controller receives the input of the user signal for landing at the first region when at least one of difference between a plurality of the measured distances to the vertically downward ground exceeds a first threshold, the controller may control the power driving unit to hover or land by moving in a predetermined distance in a horizontal direction.

More preferably, the drone may further include a plurality of seating legs provided to locations corresponding to a plurality of the sensors, respectively. If a value corresponding to a shortest one of a plurality of the measured distances to the vertically downward ground exceeds a majority of the whole plural numbers, the controller may control the power driving unit to land at the ground.

Preferably, the drone may further include a variable leg provided to a bottom end of the drone, the variable leg configured to come in contact with the ground on making the landing and maintain level according to a distance to the ground by withdrawing or inserting the variable leg.

More preferably, the variable leg may include a first shaft, a second shaft coupled with a bottom end of the first shaft to be withdrawn or inserted, and a spring provided between the first shaft and the second shaft.

More preferably, the variable leg may include a first shaft, a second shaft coupled with a bottom end of the first shaft to be withdrawn or inserted, and a driving unit provided between the first shaft and the second shaft, the driving unit including a gear to withdraw/insert the second shift from/in the first shaft by being engaged with a motor rotation under the control of the controller.

Preferably, the drone may further include a first housing having a plurality of the propellers and a second housing coupled with the first housing to enable a yaw, a pitch and a roll, the second housing having a camera. If receiving the user signal for landing at the first region, the controller may control the yaw, pitch and roll of the second housing based on the measured ground shape of the first region to enable the first housing to maintain level on an earth center and enable the second housing to be in parallel with the ground.

Accordingly, embodiments of the present invention provide various effects and/or features.

According to at least one of embodiments of the present invention, it is advantageous in that a drone approaching to land at a ground surface does not incline due to a lift difference.

According to at least one of embodiments of the present invention, it is advantageous in that a done can be landed by maintaining level against a ground surface having a height difference.

According to at least one of embodiments of the present invention, if a ground surface exceeds a predetermined height difference range, it is advantageous in that a drone can be prevented from turn over by recognizing it.

According to at least one of embodiments of the present invention, it is advantageous in that a landing point closest to an intended landing point that is not available.

According to at least one of embodiments of the present invention, it is advantageous in that a drone can be landed on an inclined plane using a housing of a gimbal structure having a camera.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 5 (*a*) and FIG. 5 (*b*) are diagrams for a status in the course of a landing process of a drone according to the present invention;

FIG. 7 (*a*) and FIG. 7 (*b*) are diagrams of a drone according to one embodiment of the present invention;

FIG. 9 (*a*) and FIG. (*b*) are diagrams of a drone according to one embodiment of the present invention;

FIG. 10 (*a*) is a lateral view diagram of a drone and a ground;

FIG. 10 (*b*) is a top view diagram of a drone and a ground;

FIG. 12 (*b*) is a top view diagram for one example of a drone and a ground;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
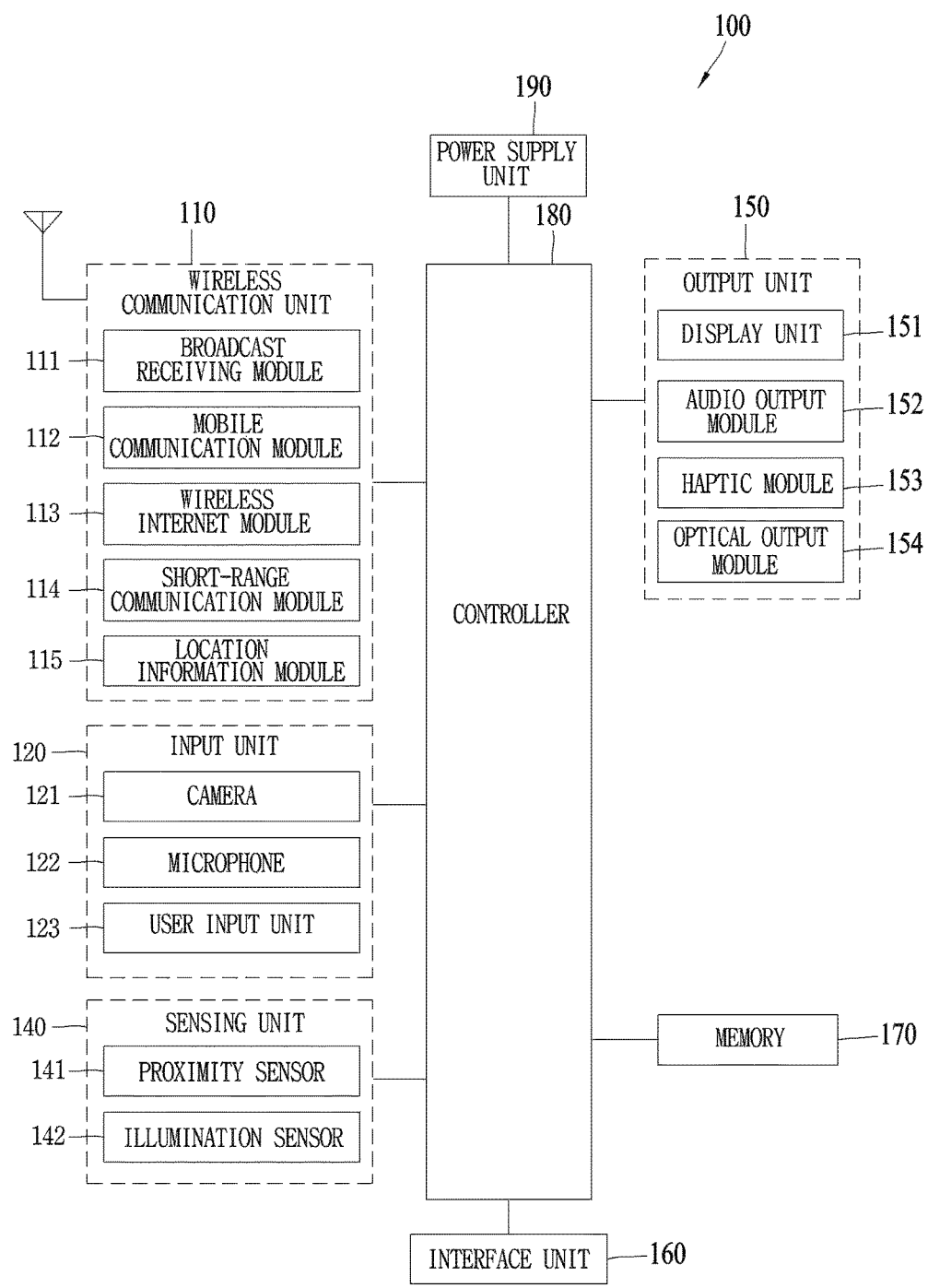
FIG. 1 is a block diagram to describe a drone related to the present invention.

FIG. 1 is a block diagram to describe a drone 100 according to the present invention.

The drone 100 may include a wireless communication unit 110, an input unit 120, a sensing unit 140, an output unit 150, an interface unit 160, a memory 170, a controller 180, a power supply unit 190, etc. It is understood that implementing all of the components shown in FIG. 1 is not a requirement for the drone, and that greater or fewer components may alternatively be implemented for the drone 100 described in the present specification.

Particularly, the wireless communication unit 110 typically includes one or more modules which permit communications such as wireless communications between the drone 100 and a wireless communication system, communications between the drone 100 and another terminal device or controller, communications between the drone 100 and an external server, and the like. Further, the wireless communication unit 110 typically includes one or more modules which connect the drone 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or a video input unit for a video signal input, a microphone 122 or an audio input unit for an audio signal input, and a user input unit 123 (e.g., a touch key, a push key, a mechanical key, etc.) configured to receive an input of information from a user. Audio or image data collected by the input unit 120 may be analyzed and processed into a user's control command.

The sensing unit 140 is typically implemented using one or more sensors configured to sense at least one of internal information of the drone 100, ambient environment information of the drone 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., the camera 121), the microphone 122, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.), to name a few. The drone 100 disclosed in the present specification may be configured to utilize combinations of informations obtained from at least two of the above-listed sensors.

A level sensing unit and a ground sensing unit, which will be described later, may be included in the sensing unit 140 as well. Since the level sensing unit and the ground sensing unit correspond to the definitions in aspect of functionality for performing the features of the present invention, they may overlap with the subordinate configuration of the above sensing unit.

The output unit 150 is typically configured to generate outputs related to optical sensation, auditory sensation, tactile sensation, and the like. The output unit 150 may include at least one of a display unit 151, an audio output unit 152, a haptic module 153, and an optical output unit 154. The display unit 151 may have an inter-layered structure or an integrated structure with a touch sensor in order to facilitate a touchscreen. The touchscreen may provide an output interface between the drone 100 and a user, as well as function as the user input unit 123 that provides an input interface between the drone 100 and the user.

As mentioned in the foregoing description, the drone 100 is generally controlled through a wireless communication with another terminal device or controller. Hence, information related to the drone is outputted through another terminal device or controller, and minimum information may be outputted through the output unit 150 of the drone 150.

The interface unit 160 serves as a passage or interface with various types of external devices that can be coupled to the drone 100. The interface unit 160 may include at least one of wired or wireless ports, external power supply ports, wired or wireless data ports, memory card ports, ports for connecting a device having an identification module, audio input/output (I/O) ports, video input/output (I/O) ports, earphone ports, and the like. The drone 100 may perform assorted control functions associated with a connected external device, in response to a case that the external device is connected to the interface unit 160.

The memory 170 is typically implemented to store data to support various functions or features of the drone 100. The memory 170 may be configured to store a multitude of application programs or applications run in the drone 100, data and commands (or instructions) for operations of the drone 100, and the like. At least some of these application programs may be downloaded from an external server via wireless communication. At least some of the application programs may be installed on the drone 100 at time of manufacturing or shipping, which is typically the case for basic functions of the drone 100. It is common for application programs to be stored in the memory 170, installed on the drone 100, and launched by the controller 180 to perform operations (or functions) of the drone 100.

The controller 180 typically functions to control overall operations of the drone 100, in addition to the operations associated with the application programs. The controller 180 may process or provide appropriate information or function to a user by processing signals, data, information and the like inputted or outputted through the above-mentioned components or running application programs stored in the memory 170.

In order to run the application program stored in the memory 170, the controller 180 may control at least one portion of the components described with reference to FIG. 1. Furthermore, in order to run the application program, the controller 180 may combine to enable at least two of the components included in the drone 100.

The power supply unit 190 may receive external power or internal power in order to supply appropriate power required for operating elements and components included in the drone 100 under the control of the controller 180. The power supply unit 190 may include a battery, and the battery may include an embedded battery, a replaceable battery, or the like.

At least one portion of the above-mentioned components can cooperatively operate to implement operations, controls or controlling methods of the drone 100 according to various embodiments mentioned in the following description. And, the operations, controls or controlling methods of the drone 100 can be implemented on the drone 100 by running at least one or more application programs stored in the memory 170.

Figure 2:
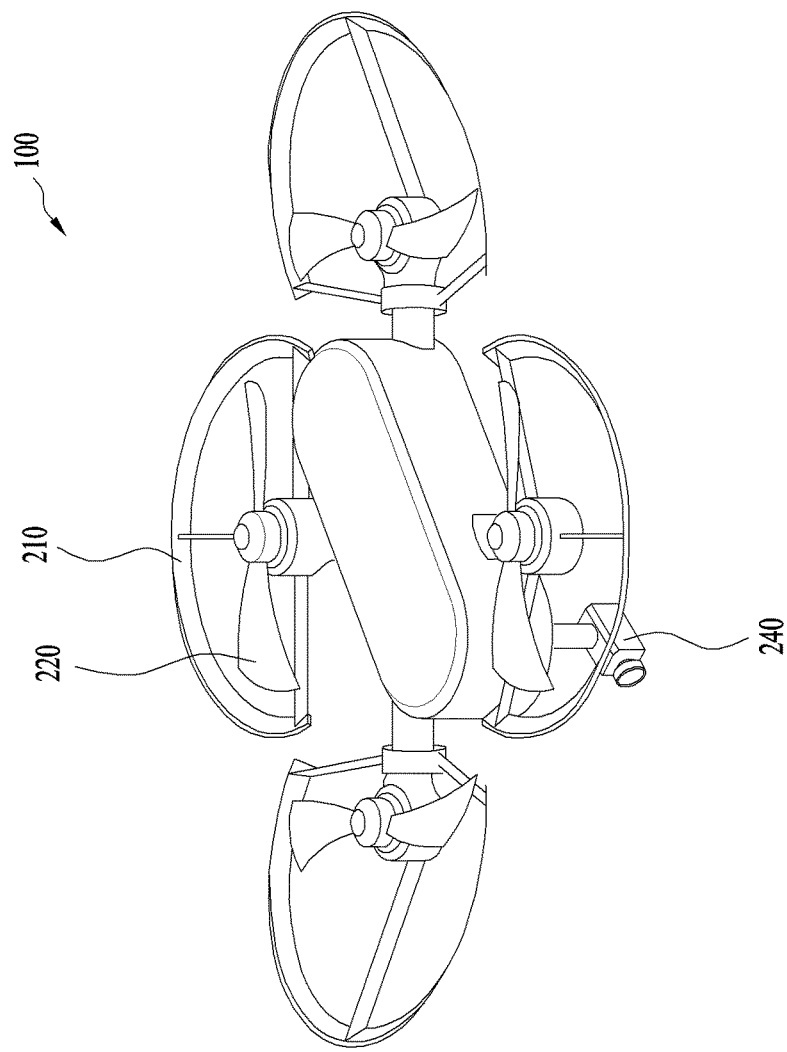
FIG. 2 is a diagram for one example of an exterior of a drone according to the present invention.

FIG. 2 is a diagram for one example of an exterior of a drone 100 according to the present invention.

Referring to FIG. 2, a drone 100 may include a propeller guard 210, a propeller 220, a body 230, a camera 240 and the like. Yet, the scope of the appended claims and their equivalents of the present invention may be non-limited by the configuration of the drone 100 shown in FIG. 2. In particular, the drone 100 may include one of a coaxial drone configured to be driven by enabling two propellers to have the same axis, a drone having several propellers to generate lift by rotating on different axes, and the like. And, the present invention is applicable to drones of various types including a helicopter type (e.g., a tricopter with 3 propellers, a quadcopter with 4 propellers shown in FIG. 2, an octacopter with 8 propellers, etc.), an airplane type and the like.

The propeller guard 210 is configured to prevent a human or animal from being hurt by an operation of the propeller 220 and may be omitted. The propeller 220 and the camera 240 operate in response to a control signal of the controller 180 shown in FIG. 1. And, a wireless communication module configured to communicate with another terminal device or controller may be included in the body 230. According to an embodiment, a detailed motion of the camera 240 can be controlled using a control signal different from that of the controller 180 (cf. FIG. 1) of the body 230.

Although FIG. 2 shows the body 230 of an all-in-one type. If necessary, in order to enable a 3-axis rotatable camera, the body 230 may have a separate structure configured with a first housing having the propeller 220 and a second housing coupled in a gimbal structure with the first housing by having a camera.

And, the drone 100 may include a seating leg 240 in order to stably stand on landing at a ground. The seating leg 240 may operate in a manner that at least three legs are unfolded in multiple directions. The seating leg 240 may have a fixed shape. If necessary, the seating leg 240 may have a foldable structure that can be folded. And, the seating leg 240 may be configured retractable.

Figure 3:
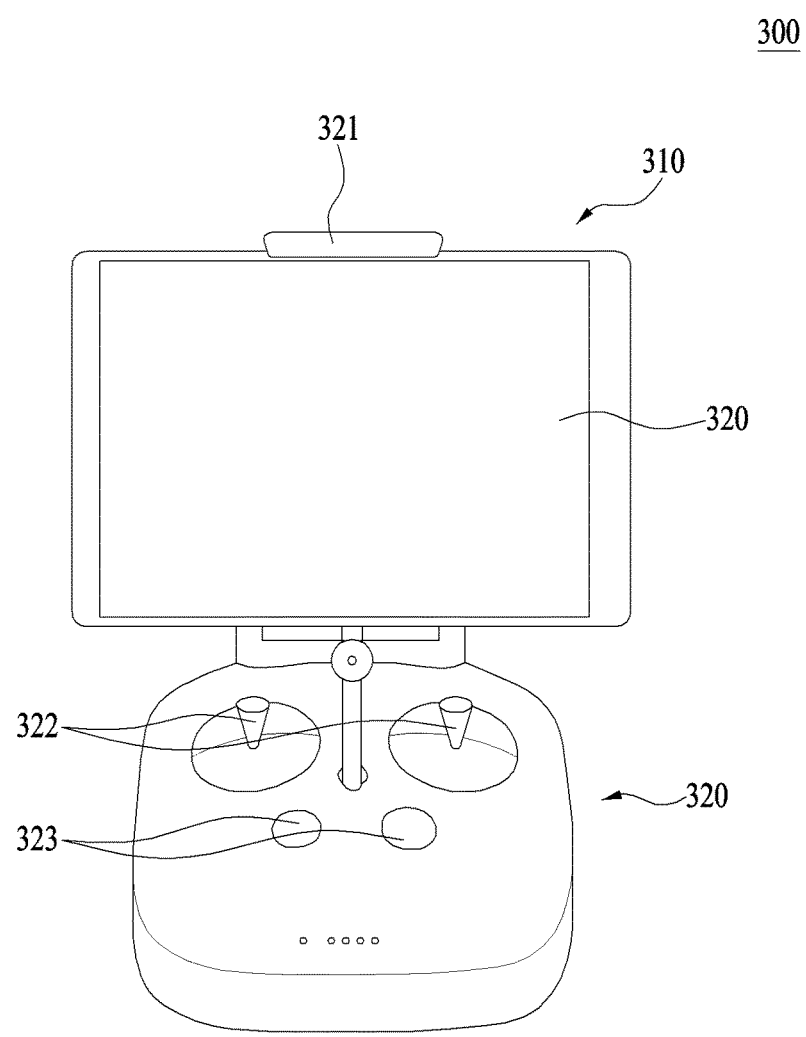
FIG. 3 is a diagram for one embodiment of a terminal device and controller related to the present invention.

FIG. 3 is a diagram for one embodiment of a terminal device 310 and a controller 320 related to the present invention.

Actuation of the drone 100, status information of the drone 100, content information generated from the drone 100 and the like can be controlled or outputted by a peripheral device 300 such as a terminal device 310 and a controller 320.

The terminal device 310 may be fixed to a terminal cradle 321 of the controller 320 by being detachably coupled thereto. The terminal device 310 may play a main role in outputting a video captured by the drone 100. If necessary, detailed settings and control of the drone 100 can be implemented through the terminal device 310.

The terminal device 310 may belong to the same scope of a mobile terminal, or include a terminal capable of short-range communications.

The controller 320 may play a main role in controlling a movement of the drone 100 to be driven. For instance, the controller 320 can input a power on/off, an altitude change, and a bearing change of the drone 100.

The altitude change and the bearing change of the drone 100 may be performed by at least one jog key 322 disclosed herein.

A single jog key 322 may be included in consideration of volume and the like. The single jog key may execute an input of the altitude or bearing change of the drone 100 through an up & down input, a tilting input, a rotation input and the like.

FIG. 3 shows one example of two jog keys 322. If the two jog keys 322 are included, it is advantageous in that the altitude change and the bearing change of the drone 100 can be simultaneously inputted using both hands.

The controller 320 may have a separate GPS module installed therein and include a separate power supply unit in general.

In some cases, the controller 320 may include an input button 323 as an input unit configured to control a power on/off, an automatic landing and the like. The input button 323 for the automatic landing may perform a function of enabling the drone 100 to be landed on a bearing of the currently flying drone 100 or a function of enabling the drone 100 to be landed by returning to a bearing near a location at which the controller 320 is located.

Yet, the terminal device 310 and the controller 320 described in the present invention are non-limited by the above embodiment and may need to include a function for moving a location of the drone by interoperating with the drone 100 only. Yet, like the following description, an embodiment of receiving an input of automatically landing the drone 100 in response to a separate input may include a user input for the corresponding input as a necessary component.

Figure 4:
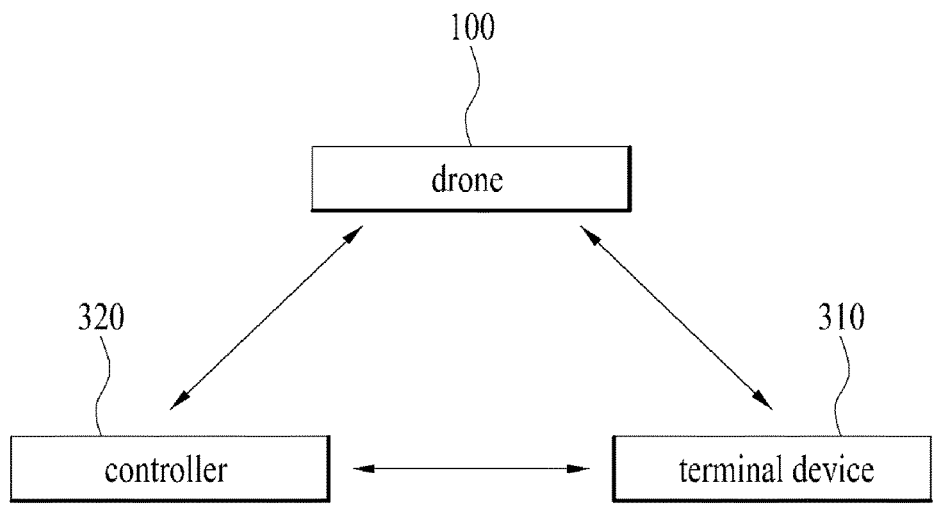
FIG. 4 (*a*) and FIG. 4 (*b*) are schematic diagrams for communications with a drone according to the present invention.
Figure 4:
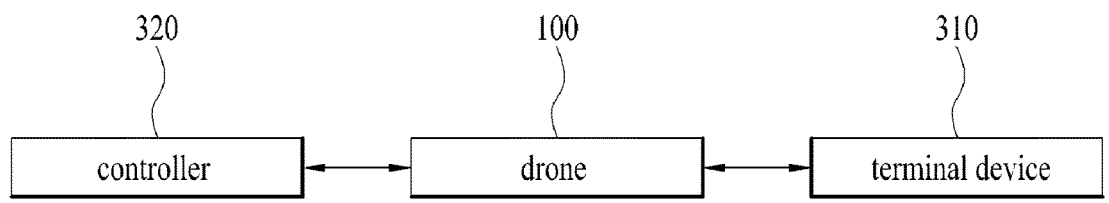

FIG. 4 (a) and FIG. 4 (b) are schematic diagrams for communications with a drone according to the present invention.

Referring to FIG. 4 (a), a drone 100 may be connected to a peripheral device 300 such as a terminal device 310 and a controller 320. An operation of the drone 100 may be directly controlled by the terminal device 310 or the controller 320. An information or control signal transmitted by the terminal device 310 may be indirectly delivered to the drone through the controller 320, and vice versa.

If the drone 100, the terminal device 310 and the controller 320 are directly connected to communicate with each other, data synchronization (sync) is enabled between two of the devices without another device, operations can be organically performed. For instance, it is able to prevent a an incorrect or wrong input that results in collision in the drone 100 between a control signal of the controller 320 for the drone 100 and a control signal of the terminal device 310 for the drone 100.

Referring to FIG. 4 (b), the drone 100 may individually communicate with each of the terminal device 310 and the controller 320. Each of the terminal device 310 and the controller 320 may independently control the drone 100, but the controller 320 is unable to directly communicate with the terminal device 310.

A video captured by the drone 100 or the like may be outputted through a display unit of the terminal device 310. If the communication shown in FIG. 4 (b) is established, each of the terminal device 310 and the controller 320 can simplify a module for communication. Advantageously, costs can be reduced and power consumption can be minimized.

If there is a contradiction to an operation of the drone 100 due to a collision between a control signal of the controller 320 and a control signal of the terminal device 310, an operation can be performed through the controller 180 (cf. FIG. 1) provided to the drone 100 by preset priority.

The following description shall be made on the assumption that a movement (or motion) of the drone 100 is controlled through the terminal device 310 or the controller 320.

FIG. 5 (a) and FIG. 5 (b) are diagrams for statuses in the course of a landing process of a drone 100 according to the present invention, Methods for landing a drone 100 can be mainly categorized into two kinds of methods. First of all, there is a method of landing a drone in manual landing mode for landing the drone on a ground 400 through user's manual manipulation of lowering an altitude. Secondly, there is a method of landing a drone on a ground 400 in automatic landing mode in a manner that the drone 100 considers other factors by receiving a separate input for a landing.

According to the former method, since this method can consecutively respond to user's altitude and bearing inputs, a time taken for a landing can be reduced. And, other inputs are not additionally required. Hence, this method is advantageous in enabling an intuitive manipulation.

Yet, when an altitude is lowered, since it is not clear whether a user intends to make a landing, a dangerous situation may occur. Since a landing speed should be consciously controlled, this method may require a more delicate speed control.

In case of using the landing control of the latter, by basically preventing altitude from being lowered unless receiving a landing control input, it may be able to put limitation on lowering the altitude so as not to be lower than a predetermined altitude.

The altitude descent or landing behavior of the drone 100 is conducted by controlling the number of revolutions of a propeller 211 that generates a lift force. The rotated propeller 211 generates a lift force against the ground 400 or a material (e.g., air, etc.) located under the propeller 211, thereby maintaining or changing an altitude. The altitude change is enabled by controlling the rotation of the propeller 211 to vary a size of a lift force.

Having received a landing input, the drone 100 can be landed on the ground 400 by gradually reducing a size of a lift force in a manner of lowering the number of revolutions of a propeller.

Regarding a plurality of the propellers 211 of the drone 100, it is able to move a bearing of the drone 100 by differently controlling the number of revolutions of each of a plurality of the propellers 211. Hence, when the drone 100 is landed, in order for the drone 100 to descend vertically at a location while maintaining level, a plurality of the propellers 211 should have the same number of revolutions in principle.

Yet, when a surface of the ground 400 is uneven, if the number of revolutions of each of a plurality of the propellers 211 is controlled equally, a lift force difference is generated from the uneven surface of the ground 400. Namely, a lift force generated by the propeller 211 corresponding to a convex ground surface is greater than a lift force generated by the propeller 211 corresponding to a concave ground surface.

Eventually, the drone 100 may incline due to a lift difference of each region like the status shown in FIG. 5 (b). If the lift force difference exceeds a predetermined value, the drone 100 may overturn possibly.

Although a balance is maintained by balancing the lift, since a surface of the ground 400 is irregular, a landing of the drone 100 is not stable. Hence, the drone 100 may possibly overturn.

Thus, the present invention intends to solve the overturn problem caused by an imbalance of the ground 400 or a lift difference when the drone 100 is landed.

Figure 6:
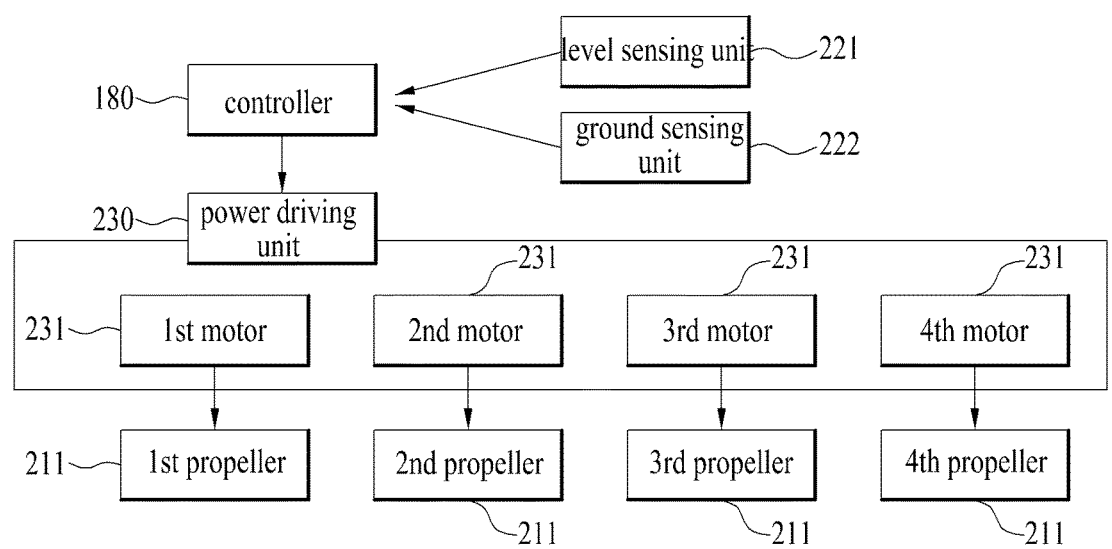
FIG. 6 is a schematic diagram for a power driving of a drone according to the present invention.

FIG. 6 is a schematic diagram for a power driving of a drone according to the present invention.

A plurality of propellers 211 may create lift by rotations.

A power driving unit 230 may play a role in providing rotation power, and include a motor 231 as a representative example. The motor 231 of the power driving unit 230 may include a plurality of motors to correspond to the number of a plurality of propellers 211, thereby independently adjusting the number of revolutions of each of the propellers 211 so as to differentiate a rotation ratio of each of the propellers 211.

A controller 180 may adjust the number of revolutions of each of a plurality of the propellers 211 through the power driving unit 230.

A level sensing unit 221 may measure an inclination angle of the drone 100 with a gravity direction. Hence, the level sensing unit 221 can determine whether to be leveled on the ground 400. In doing so, with respect to the ground 400, a direction vertical to the gravity direction can be regarded as a direction of the ground 400.

Based on the inclination angle of the drone 100 measured by the level sensing unit 221, the drone 100 generates a lift difference by differentiating the rotation ratio of each of the propellers 211, thereby maintaining level. Namely, the control of the inclination of the drone 100 through the level sensing unit 221 can be regarded as performing a function of post-feedback, whereas the control of the inclination of the drone 100 through a ground sensing unit 222, which will be described later, can be regarded as performing a function of a pre-feedback.

The level sensing unit 221 may include a gyroscope sensor for example.

The ground sensing unit 222 may obtain a shape of at least one region of the ground 400. Details of the ground sensing unit 222 shall be described later.

FIG. 7 (a) and FIG. 7 (b) are diagrams of a drone 100 according to one embodiment of the present invention.

A ground sensing unit 222 may measure a distance to at least one region and a shape of the at least one region. The at least one region measured by the ground sensing unit 222 may mean a specific first region including a landing point. In a narrow sense, the first region may include a region at which the drone 100 will land directly. In a broad sense, the first region may mean a region at which the drone 100 will land potentially.

For instance, the first region shown in FIG. 7 (a) may mean a region having a point vertically downwards under a plurality of ground sensing units 222 provided to the drone 100.

The ground sensing unit 222 may include a laser sensor or an ultrasonic sensor, by which the ground sensing unit 222 is non-limited. And, the ground sensing unit 222 may include every non-optical or optical sensor capable of obtaining a distance.

A sensor of the ground sensing unit 222 measures a reflective time in a target direction, thereby measuring a distance from the sensor in the corresponding direction.

When distances to several points are measured using a plurality of such sensors, it is able to measure an overall shape of a prescribed region of a ground by collecting the measured distances.

The ground sensing unit 222 shown in FIG. 7 (a) may include a plurality of sensors. A plurality of the ground sensing units 222 measure vertically downward distances, thereby approximately determining a step difference of the ground 400 or a presence or non-presence of inclination of the ground 400. If a plurality of the ground sensing units 222 is tiltable, it may be able to obtain a ground shape wider than the first region shown in the drawing. And, the ground sensing unit 222 may include a laser sensor, an ultrasonic sensor, or the like.

If a single ground sensing unit 222 is provided, although a direction other than a vertically downward direction is sensed by tilting an angle of the ground sensing unit 222, as shown in FIG. 7 (b), it may happen that a measurement cannot be accurately performed depending on a shape of the ground 400.

Hence, it is preferable that a plurality of the ground sensing units 222 is provided rather than a single ground sensing unit 222. If the ground sensing units 222 are provided in a manner of being distributed in an outer region of the drone 100, the shape of the ground 400 for the first region can be measured more accurately.

The ground sensing unit 222 includes sensors provided to locations corresponding to a plurality of propellers 221 in a manner that the number of sensors is set equal to that of propellers 221. Particularly, the ground sensing unit 222 and the propeller 221 corresponding to the ground sensing unit 222 can be aligned on the same vertical line. If the ground sensing unit 222 and the propeller 221 are located on the same vertical line, since a feedback can be exactly given to the propeller 221 based on a distance to a vertically downward ground sensed by the ground sensing unit 222, it is able to reduce the incidence of error.

The ground sensing unit 222 may include a vision sensor. The vision sensor can obtain a shape of the first region more specifically. Namely, in comparison with other sensors, the vision sensor enables a wider sensing in a direction faced by the sensor. Hence, unlike the aforementioned sensors, a similar measurement effect can be obtained without changing a direction.

As a representative example of the vision sensor, there is an optical flow sensor (OFS), a Kinect using RGB sensor and IR sensor, or the like. Compared to the aforementioned specific ground sensing unit 222, the vision sensor can obtain a shape of a relatively wide region of the ground 400.

Figure 8:
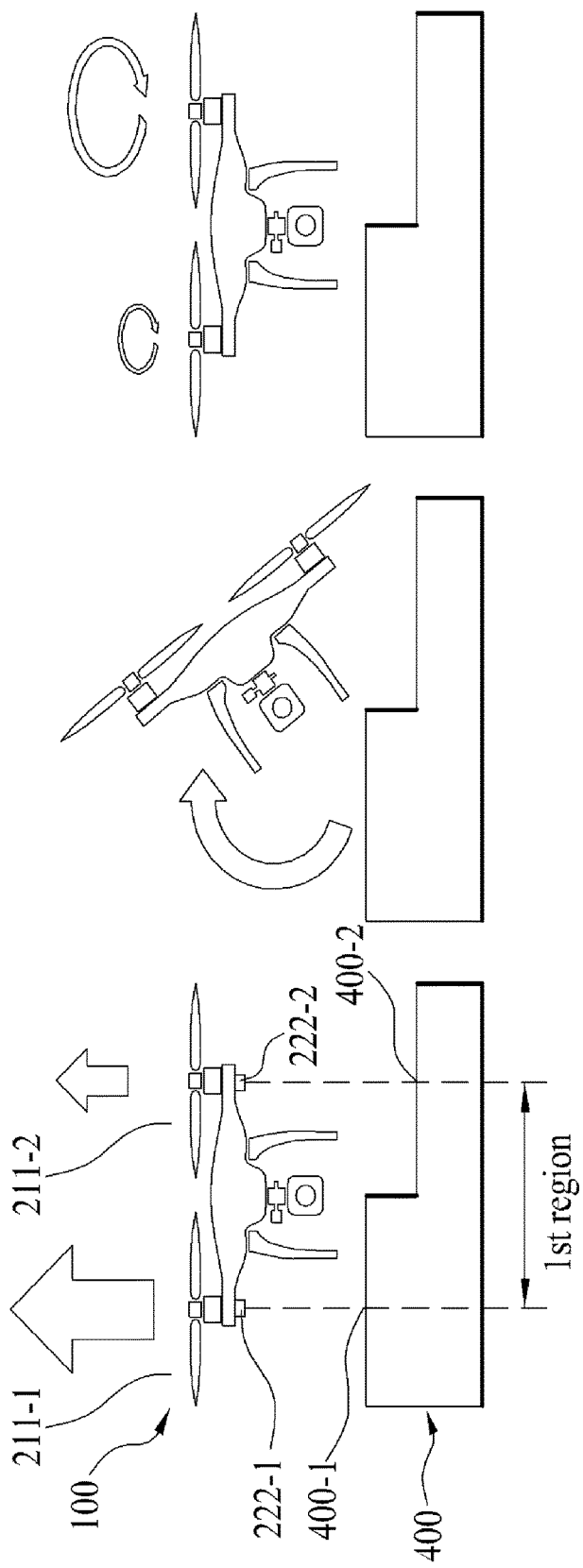
FIG. 8 (*a*), FIG. 8 (*b*) and FIG. 8 (*c*) are diagrams of a drone according to one embodiment of the present invention.

FIG. 8 (a), FIG. 8 (b) and FIG. 8 (c) are diagrams of a drone 100 according to one embodiment of the present invention.

A process for the drone 100 having received an input of a user signal in the course of landing at a first region is described as follows.

If a height of a ground 400 sensed by the ground sensing unit 222 is not uniform, the controller 180 may control the power driving unit 230 to differentiate the numbers of revolutions of a plurality of propellers 211.

Namely, based on the distance to the first region or the shape of the first region, which is measured by the ground sensing unit 222, the controller 180 may control the power driving unit 230 to differentiate rotation ratios of a plurality of propellers 211.

In FIG. 8 (a), a propeller 211 on a left side is named a first propeller 211-1, a propeller 21 shown on a right side is named a second propeller 211-2, a point of a ground corresponding to the first propeller 211-1 is named a first point 400-1, and a point of the ground corresponding to the second propeller 211-2 is named a second point 400-2.

Herein, 'corresponding to' may mean that each point is located vertically downwards under or near each propeller.

If a height of the first point 400-1 measured by the ground sensing unit 222 is higher than that of the second point 400-2, a distance measured by a second ground sensing unit 222-2 is shorter than that measured by a first ground sensing unit 222-1 of the drone 100.

Namely, the meaning of 'distance is short' may indicate that a height of the ground is high. And, the meaning of 'distance is long' may indicate that a height of the ground is low.

If the first and second propellers 211-1 and 211-2 of the drone 100 are rotated at the same rotation speed as usual, the first propeller 211-1 having a relatively shorter distance may create stronger lift owing to larger resistance. Due to such an effect, as shown in FIG. 8 (b), the drone 100 may incline to the right.

In order to prevent such inclination, as shown in FIG. 8 (c), the controller 180 of the drone 100 may control the power driving unit 230 to provide the first propeller 211-1 with a rotation power having the number of revolutions smaller than that of the second propeller 211-2.

Through this, the drone 100 can approach the ground 400 without inclination despite moving near the irregular surface of the ground 400.

In automatic landing mode, it is unnecessary to differentiate a rotation ratio of the propeller 211 in consideration of a height difference of each point of the ground 400 even if the drone 400 is located at a sufficient altitude from the ground 400. Hence, the control of differentiating the rotation ratio of the propeller 211 by the controller 180 (cf. FIG. 1) is applicable to a case of being equal to or lower than a first threshold altitude.

Moreover, on the assumption of the case below the first threshold altitude, the lower the altitude gets or the bigger the height difference between points becomes, the bigger the rotation ration of each propeller 211 gets.

In case of manual landing mode in which the drone 200 approaches the ground 400 in a manner that a user manually lowers an altitude of the drone 100, it is unable to obtain user's intention to enable the drone to land or continue to fly. Hence, it is necessary to set a virtual height for intending a landing. Thus, only if a distance to the ground 400 measured by the ground sensing unit 222 is equal to or smaller than a specific distance, it is able to perform a process for controlling the power driving unit 230 to enable the drone 100 to maintain level.

After the drone 100 has approached the ground 100 by maintaining level near the ground 400, a process for the drone 100 to be completely seated on the ground 400 is described as follows.

FIG. 9 (a) and FIG. 9 (b) are diagrams of a drone 100 according to one embodiment of the present invention.

If a height difference between a left side and a right side is not big, as shown in FIG. 9 (a), although the drone 100 is seated on a ground 400, since the drone 100 can be seated while inclining at a predetermined angle, it may not cause a problem.

On the other hand, if a height difference between a left side and a right side exceeds a first threshold, the drone 100 overturns. Regarding the first threshold, a weight center of the drone 100, a height difference of the ground 400 and the like are the major factors in determining whether the drone 100 overturns. Since the weight center is a fixed value, the first threshold can be specified.

In this case, a method for preventing the drone 100 from overturning in the course of landing is described as follows.

First Embodiment

FIG. 10 (*a*) is a lateral view diagram of a drone 100 and a ground 400, and FIG. 10 (*b*) is a top view diagram of a drone 100 and a ground 400.

If the drone 100 computes that it is dangerous to land at a current point, i.e., if a difference in a distance to a vertically downward ground 400 measured by a plurality of the ground sensing units 222 exceeds a first threshold, the controller 180 controls the power driving unit 230 to hover in the sky by holding the landing of the drone 100 and or land the drone 100 in a manner of changing a bearing into another point (i.e., a horizontal direction) by maintaining a hovering state, moving in a predetermined distance, and then landing.

In this case, a vertically downward direction may mean a downward direction with reference to the drone 100 or an earth center direction. And, 'hovering' may mean 'stopping by maintaining an altitude' or 'moving by changing a bearing only'.

While moving in a bearing along a first path to a second region corresponding to a random specific point near a first region, the drone 100 can move continuously until a region equal to or smaller than a first threshold appears.

In the course of the first path for moving from the first region to the second region, if a region meeting the region equal to or smaller than the first threshold is measured, the drone 100 can be seated on the ground 400.

Yet, in the course of the first path for moving to the second region, if a region meeting the region equal to or smaller than the first threshold is not measured, the drone 100 may circle along a second path for forming a circle greater than the first region centering on the first region.

While circling along the second path, if a region meeting the region equal to or smaller than the first threshold is measured, the drone 100 can be seated on the ground 400 as well.

If a region meeting the region equal to or smaller than the first threshold is not measured from the second path, the drone 100 moves to a third region corresponding to one point on a third path extending from the first path and then measure a landing point by moving in the same manner of a previous moving pattern.

As the above moving method corresponds to a process for searching for a region closest to the first region at which a user desires to land the drone 100 and has a relatively short moving distance for finding a landing region, it may has a synergistic effect.

Second Embodiment

Figure 11C:
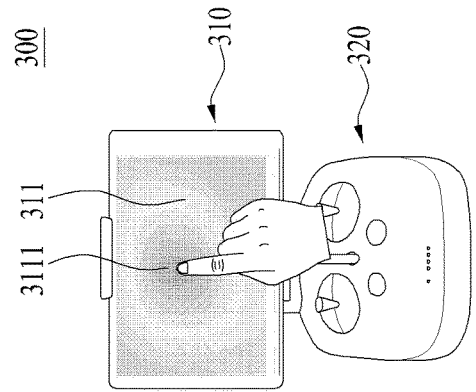
FIG. 11 (*a*), FIG. 11 (*b*) and FIG. 11 (*c*) are diagrams for examples of giving a feedback to a user when a drone is unable to land at a first area.
Figure 11B:
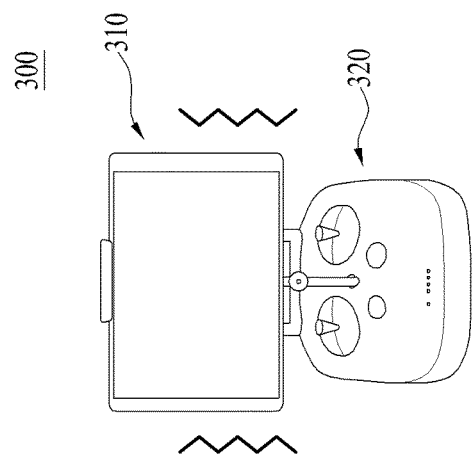
Figure 11A:
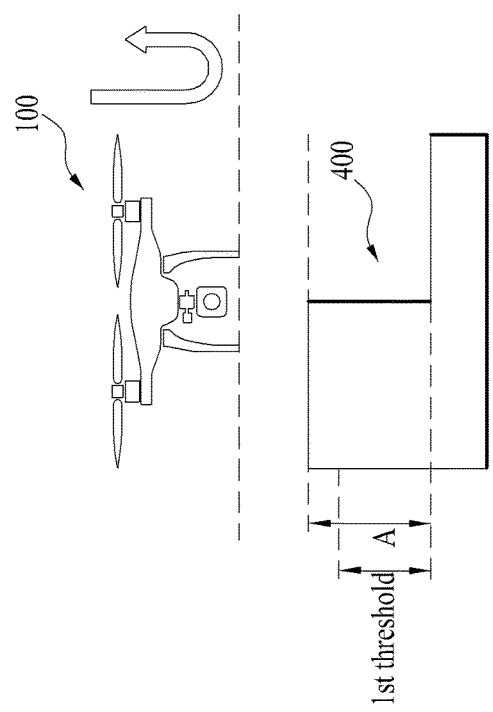

FIG. 11 (*a*), FIG. 11 (*b*) and FIG. 11 (*c*) are diagrams for examples of giving a feedback to a user when a drone 100 is unable to land at a first area.

If a height difference of a first region measured by the drone 100 exceeds a first threshold, the drone 100 may perform a landing impossibility notification while making a flight by maintaining a state of maintaining a predetermined height altitude in the first region. The landing impossibility notification may include a visual notification in case of a presence of a display, a sound notification through a speaker or the like, or a vibration notification.

For instance, as a signal of impossibility of a landing of the drone 100, as shown in FIG. 11 (*a*), it may be able to give a bouncing feedback in a manner of bouncing over a drone located altitude and then descending at an original altitude. Through the bouncing feedback, a user can be more intuitively aware that the drone 100 is able to land at the first region.

The notification may be directly generated through the drone 100. Alternatively, as shown in FIG. 11 (*b*), the notification may be indirectly generated through a peripheral device 300 such as a terminal device 310 or a controller 320 for controlling the drone through a wireless communication unit of the drone 100.

Alternatively, it may be able to perform a feedback in a manner of deactivating a button for performing a landing input of the controller 320. For instance, if a touchscreen for controlling a motion of the drone 100 is provided to the controller, an icon displayed on the touchscreen to perform a landing of the drone 100 is semi-transparentized and deactivated so as not to be inputted. Such a deactivation of a landing input can be checked continuously in an existing altitude state previous to descent of the drone 100. And, it is unnecessary for the drone 100 to have a descending motion in the sky of the landing-impossible first region. Hence, the deactivation of the landing input is efficient.

Alternatively, as shown in FIG. 11 (*c*), a landing point closest to the first region is found and displayed as an output of coordinates 3111 on a display 311 of the terminal device 310 or the controller 320.

Yet, in order to find the landing point closest to the first region, it is able to assume a case that a shape of the ground 400 can be measured on a wide region including a vertically downward direction of the drone 100 by using the vision sensor or rotating the tiltable ground sensing unit 222.

Third Embodiment

Figures 12A, 12B:
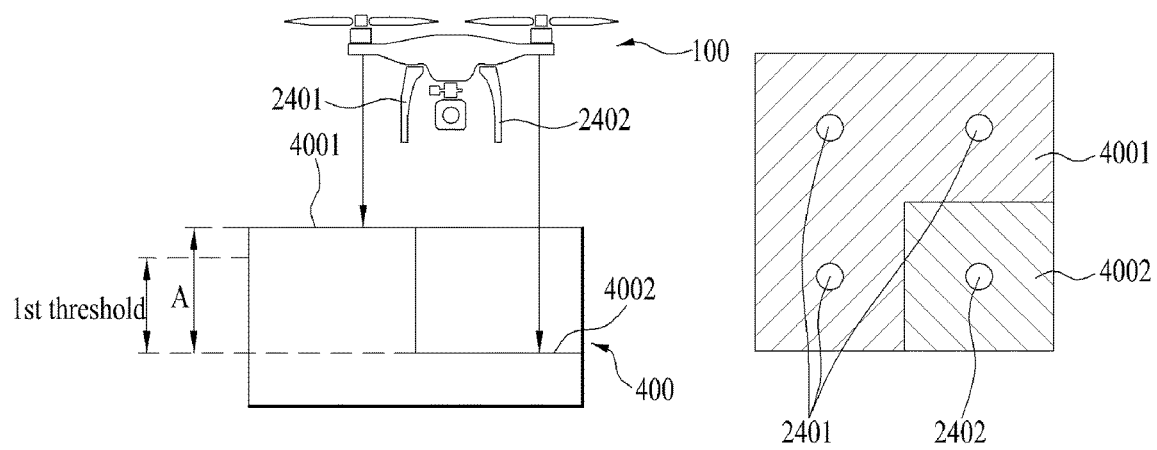
FIG. 12 (*a*) is a lateral view diagram for one example of a drone and a ground.

FIG. 12 (*a*) is a lateral view diagram for one example of a drone 100 and a ground 400, and FIG. 12 (*b*) is a top view diagram for one example of a drone 100 and a ground 400.

Although a height difference for a point of a first region measured by the drone 100 exceeds a first threshold, it may be possible for the drone 100 to land on the ground 400.

A plurality of seating legs 240 can be provided to locations corresponding to a plurality of propellers 221 or sensors in a manner that the number of the seating legs 240 is set equal to that of the propellers 221 or the sensors of the ground sensing unit 222, respectively. The corresponding location may location on the same line in a vertical direction of the drone 100.

If a plurality of seating legs 240 provided to come in contact with the ground 400 are provided to the drone 100, although a height difference between a point 4001 on which one seating leg 2401 will be seated and a point 4002 on which the other seating leg 2402 will be seated exceeds a first threshold, if a height difference of points corresponding to the one seating leg 2401 is equal to or smaller than the first threshold, the drone 100 may be possibly seated.

For instance, when four seating legs 240 are provided in four directions to correspond to four propellers 221 of the drone 100, although a height of the ground 400 corresponding to one of the four seating legs 240 and a height corresponding to the rest of the three seating legs 240 exceed the first threshold, if a height difference between surfaces of the ground 400 corresponding to the rest of the three seating legs 240 is equal to or smaller than the first threshold, even if the drone 100 is seated on the ground 400, the three seating legs 240 can be supported by the ground 400.

Namely, if a value corresponding to the shortest distance among the measured distances to a plurality of vertically downward surfaces of the ground exceeds a majority of the whole plural numbers, the controller 180 can control the power driving unit 230 to make a landing.

Unlike the first to third embodiments, for a balanced landing, the drone 100 may have a structure that a length of a leg is physically variable. Namely, the drone 100 may be provided with a variable leg.

Namely, a variable length mentioned in the following description may mean a case that a length of at least one of seating legs provided to the drone 100 is variable.

Fourth Embodiment

Figure 13:
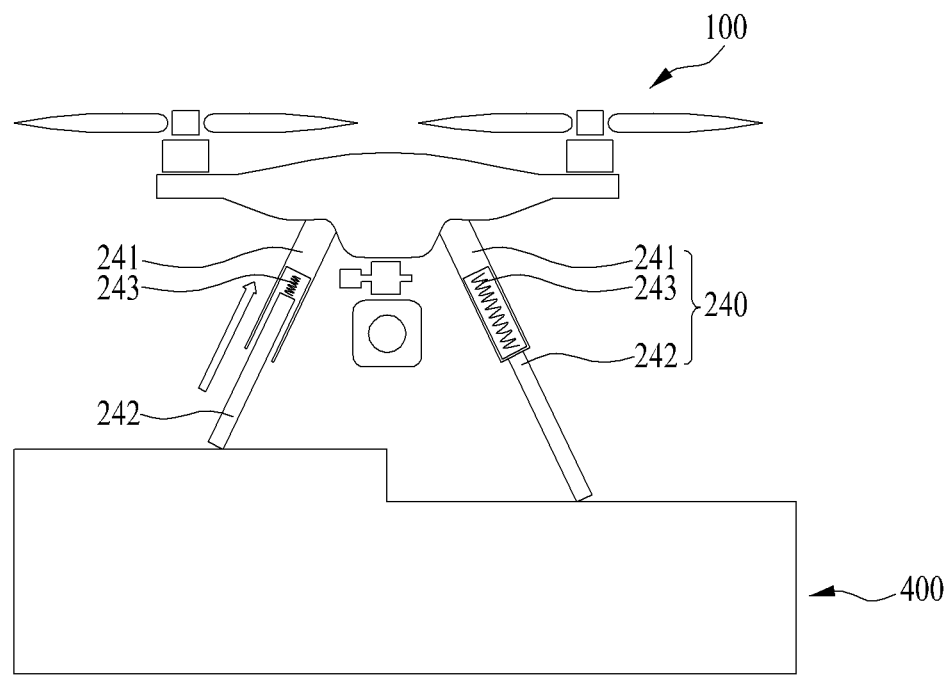
FIG. 13 is a cross-sectional diagram of a drone according to the present invention.

FIG. 13 is a cross-sectional diagram of a drone 100 according to the present invention. And, FIG. 14 (*a*), FIG. 14 (*b*), FIG. 14 (*c*) and FIG. 14 (*d*) are cross-sectional diagrams of a drone 100 according to the present invention.

The drone 100 is provided with at least one variable leg differently retractable in length. And, the drone 100 can be seated on the ground 400 may maintaining level of the drone 100 in a manner of adjusting the variable leg to fit a shape of the ground 400 at which the drone 100 lands.

The variable leg may include a first shaft 241, a second shaft 242, a spring and the like. The first shaft 241 of the variable leg may be provided to a bottom end of the drone 100. The first shaft 241 may have a hollow part to enable the second shaft 242 to be inserted in or drawn out of the first shaft 242.

The second shaft 242 may be retractably coupled with a bottom end of the first shaft. And, the second shaft 242 may play a role in directly coming in contact with the ground 400.

Fourth Embodiment-1

The drone 100 may include a variable leg having a spring 243.

The spring 243 is installed between the first shaft 241 and the second shaft 242 to play a role in pushing out the second shaft 242 in a bottom direction.

The second shaft 242 can be provided in a manner of being maximally withdrawn from the shaft 241 while not coming in contact with the ground.

While the drone 100 lands at the ground 400, if the seating legs 240 are supported by a floor, the second shaft 242 of a prescribed one of the seating legs 240 is compressed to correspond to a shape of the floor, the drone 100 can be balanced overall.

Fourth Embodiment-2

Figures 14A, 14B:
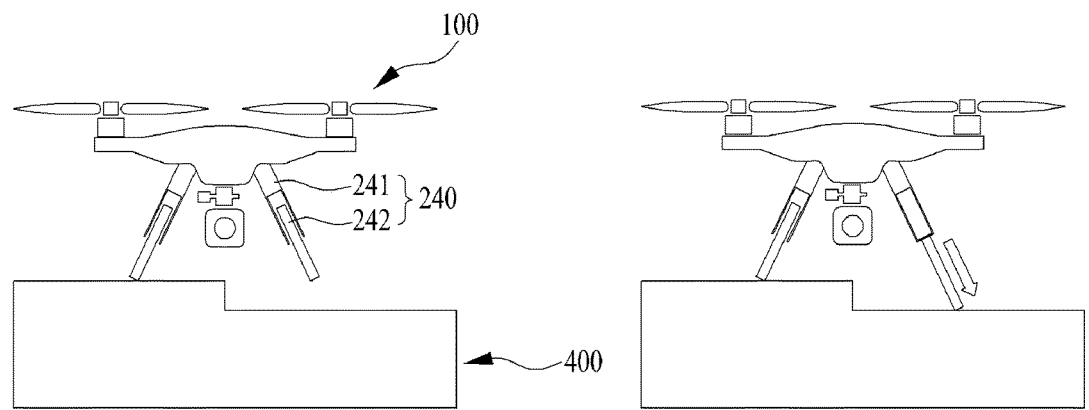
FIG. 14 (*a*), FIG. 14 (*b*), FIG. 14 (*c*) and FIG. 14 (*d*) are cross-sectional diagrams of a drone according to the present invention.
Figures 14C, 14D:
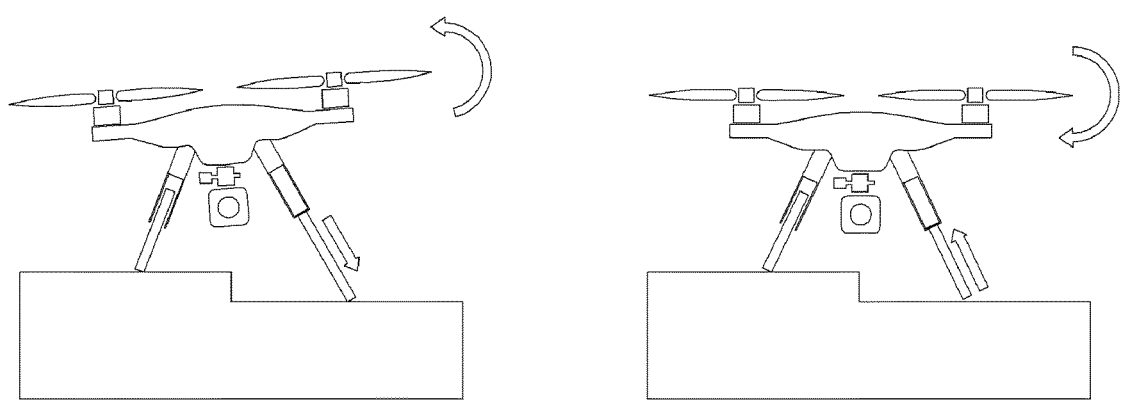

FIGS. 14 (*a*) to 14 (*d*) shows one embodiment of a process for landing at a ground 400 using a seating leg 240 having a linear actuator in order.

Unlike the spring structure of the fourth embodiment-1, the seating leg 240 may include a variable leg having a linear actuator. For instance, through the coupling between a motor and a pinion gear, a second shaft 242 can be retractably withdrawn from a first shaft 241. The withdrawal of the second shaft 242 through the linear actuator may be performed by maintaining level through the level sensing unit 221.

Having received a landing input, the drone 100 can approach the ground 400 in a state that the second shaft 242 is inserted in the first shaft 241. The second shaft 242 of a variable leg touching the ground 400 in the first place among a plurality of variable legs maintains its state without being withdrawn. Regarding the rest of the variable legs, the second shaft 242 is gradually withdrawn from the first shaft 241 through the coupling between the motor and the gear until supported by the ground 400.

Whether the second shaft 242 is supported by the ground 400 can be obtained through whether the drone 100 loses its level due to the withdrawal of the second shaft 242. For instance, after one of the second shafts 242 has been withdrawn and then supported by the ground 400, if the corresponding second shaft is further withdrawn, as shown in FIG. 14 (*c*), the level of the drone 100 may be lost.

The controller 180 senses the lost level through the level sensing unit 221 and then controls the motor to stop withdrawing the second shaft 242 or insert the second shaft 242 back in a predetermine distance. The controller 180 controls the withdrawals of the rest of the variable legs 240 in the same manner, thereby landing the drone 100 at the ground 400 by maintaining overall level of the drone 100.

Fifth Embodiment

Figure 15:
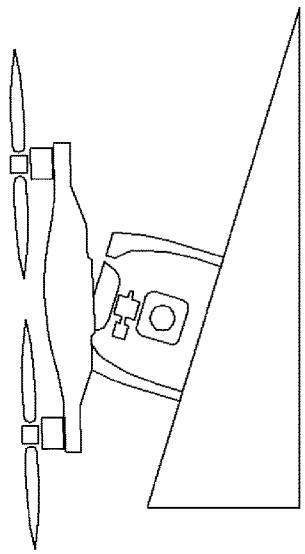
FIG. 15 (*a*), FIG. 15 (*b*) and FIG. 15 (*c*) are diagrams to describe another example of a landing process of a drone according to the present invention.
Figure 15B:
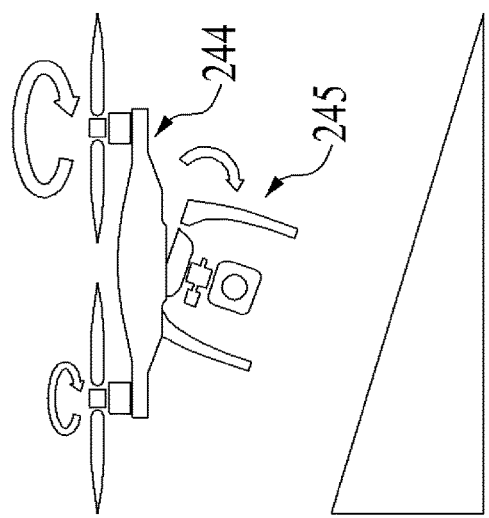
Figure 15A:
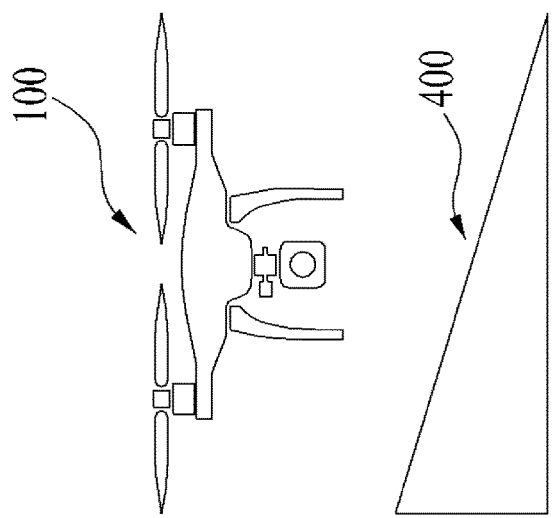

FIG. 15 (*a*), FIG. 15 (*b*) and FIG. 15 (*c*) are diagrams to describe another example of a landing process of a drone 100 according to the present invention.

FIG. 15 (*a*) shows a step for the drone 100 to obtain a shape of a ground 400. FIG. 15 (*b*) shows a step for the drone 100 to differentiate a rotation ratio of a propeller 211 to fit a shape of the ground 400 and rotate a second housing 245 landing to fit the shape of the ground 400. FIG. 15 (*c*) shows a step for the drone 100 to land at the ground 400 in a state that the second housing 245 is rotated to fit the shape of the ground 400.

Using a gear of a gimbal structure, the drone 100 may be landed at the ground 400 by maintaining level of the drone 100. Namely, a first housing 244 in which major parts such as the propeller 211 are installed and the second housing 245 configured to be supported by a floor are separated from each other. When the drone 100 lands at the ground 400 by coupling the first housing 244 and the second housing 245 together by the gear of the gimbal structure, the first housing 244 maintains level on an earth center and the second housing 245 inclines in parallel with the ground 400, whereby the drone 100 can stably make a landing.

The second housing 245 can may yaw, pitch and role for the first housing 244 through the gear of the gimbal structure.

The ground sensing unit 222 measures a height difference of the ground 400 and the controller 180 enables the second housing 245 to yaw, pitch and roll to correspond to the measured height difference, whereby a support part provided to the second housing 245 can have the same state of the height difference of the ground 400.

The rotation of the second housing 245 using the gear of the gimbal structure can be implemented by the actuator including the motor coupled with the gear of the gimbal structure. Based on the height difference of the ground 400 measured by the ground sensing unit 222, the controller 180 can control the actuator to rotate the gear of the gimbal structure.

The second housing 245 may be provided with a camera as well. Namely, in order to use the camera, the flying drone 100 rotates the second housing 245. And, the landing drone 100 can rotate the second housing 245 for a landing structure. Thus, the gear of the gimbal structure can be simultaneously used for two kinds of purposes.

It will be appreciated by those skilled in the art that various modifications and variations can be made in the present invention without departing from the spirit or scope of the inventions.

This description is intended to be illustrative, and not to limit the scope of the claims. Thus, it is intended that the present invention covers the modifications and variations of this invention provided they come within the scope of the appended claims and their equivalents.

The present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A drone, comprising:
    a plurality of propellers configured for creating a lift;
    a power driving unit configured for providing a rotation power to each of the plurality of propellers;
    a ground sensing unit configured for measuring a distance to a first region of the ground and a shape of the first region;
    a controller configured for controlling the power driving unit to differentiate rotation ratios of the plurality of propellers based on the measured distance and shape in response to an input for landing at the first region; and
    a variable leg provided to a bottom end of the drone, the variable leg configured to come into a contact with the ground on making the landing and maintain level according to a distance to the ground by withdrawing or inserting the variable leg,
    wherein the variable leg comprises:
        a first shaft;
        a second shaft coupled with a bottom end of the first shaft to be withdrawn or inserted; and
        a spring provided between the first shaft and the second shaft.

2. The drone of claim 1, wherein the plurality of propellers comprise a first propeller and a second propeller and wherein if a height of a first point of the ground corresponding to the first propeller is higher than that of a second point of the ground corresponding to the second propeller, the controller is further configured to control the power driving unit to provide a rotation power of the first propeller smaller than that of the second propeller.

3. The drone of claim 1, wherein the controller is further configured to control the power driving unit to differentiate the rotation ratios of the plurality of propellers only if an altitude of the drone is equal to or smaller than a first threshold altitude.

4. The drone of claim 1, wherein the ground sensing unit comprises a plurality of sensors configured to measure distances to a vertically downward ground by being provided to locations corresponding to the plurality of propellers, respectively.

5. The drone of claim 4, wherein when at least one of the difference between a plurality of the measured distances to the vertically downward ground exceeds a first threshold, the controller is further configured to control the power driving unit to hover or land by moving in a predetermined distance in a horizontal direction.

6. The drone of claim 4, further comprising a plurality of seating legs provided to locations corresponding to a plurality of the sensors, respectively and wherein if a value corresponding to a shortest one of a plurality of the measured distances to the vertically downward ground exceeds a majority of the whole plural numbers, the controller is further configured to control the power driving unit to land at the ground.

7. The drone of claim 1, the variable leg further comprising:
    a driving unit provided between the first shaft and the second shaft, the driving unit including a gear to withdraw or insert the second shift from or in the first shaft by being engaged with a motor rotation under the control of the controller.

8. The drone of claim 1, further comprising:
    a first housing having a plurality of propellers; and
    a second housing coupled with the first housing to enable a yaw, a pitch and a roll, the second housing having a camera,
    wherein if receiving the signal for landing at the first region, the controller is further configured to control the yaw, pitch and roll of the second housing based on the measured ground shape of the first region to enable the first housing to maintain level on an earth center and enable the second housing to be in parallel with the ground.

* * * * *